United States Patent
Baker, Jr. et al.

(10) Patent No.: US 11,212,769 B1
(45) Date of Patent: Dec. 28, 2021

(54) CONTEXTUAL AWARE ELECTRONIC ALERT SYSTEM

(71) Applicant: Wells Fargo Bank, N.A., San Francisco, CA (US)

(72) Inventors: Gene C. Baker, Jr., Eldersburg, MD (US); John A. Craft, Poolesville, MD (US); Sai Ganesh, Germantown, MD (US); John Phillip Marquiss, Sr., Chambersburg, PA (US); Thomas A. Obreiter, Frederick, MD (US); John Lee Thompson, Sykesville, MD (US); Reynaldo B. Timonera, Frederick, MD (US); Kenneth Bryan von Hagel, Mount Airy, MD (US); Jingjiu Wang, Fairfax, VA (US); David W. Loomis, Clarksburg, MD (US); Irina Seabolt, Mount Airy, MD (US); Umamaheswari Veeraswami, Potomac, MD (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 16/889,019

(22) Filed: Jun. 1, 2020

Related U.S. Application Data

(63) Continuation of application No. 15/456,061, filed on Mar. 10, 2017, now Pat. No. 10,674,476.

(51) Int. Cl.
| | |
|---|---|
| *H04W 68/00* | (2009.01) |
| *H04R 29/00* | (2006.01) |
| *G06F 15/173* | (2006.01) |
| *G06F 15/16* | (2006.01) |
| *H04W 68/02* | (2009.01) |

(Continued)

(52) U.S. Cl.
CPC ............ *H04W 68/02* (2013.01); *H04L 51/24* (2013.01); *H04W 4/02* (2013.01)

(58) Field of Classification Search
CPC .......... H04W 68/02; H04W 4/02; H04L 51/24
USPC .......................................................... 455/458
See application file for complete search history.

(56) References Cited

U.S. PATENT DOCUMENTS

| | | | |
|---|---|---|---|
| 8,359,274 | B2 | 1/2013 | Yoder et al. |
| 8,407,125 | B2 | 3/2013 | Jenson et al. |
| 8,538,967 | B1 | 9/2013 | Wu et al. |

(Continued)

OTHER PUBLICATIONS

"U.S. Appl. No. 15/456,061, Appeal Brief filed Nov. 25, 2019", 17 pgs.

(Continued)

*Primary Examiner* — Mark G. Pannell
(74) *Attorney, Agent, or Firm* — Schwegman Lundberg & Woessner, P.A.

(57) ABSTRACT

A method may include receiving an indication that an electronic alert is to be transmitted to a user; obtaining contextual information associated with the user; determining a first time for presenting the electronic alert to the user based in part on the contextual information; transmitting the electronic alert to a computing device associated with the user at the first time; storing the electronic alert in a message feed data structure; receiving a request to view the electronic alert at a second time, the second time occurring after the first time; in response to the request, retrieving the electronic alert from the message feed data structure; and transmitting the electronic alert at the second time.

21 Claims, 4 Drawing Sheets

(51) Int. Cl.
*H04L 12/58* (2006.01)
*H04W 4/02* (2018.01)

(56) References Cited

U.S. PATENT DOCUMENTS

| | | | |
|---|---|---|---|
| 9,147,001 B1* | 9/2015 | Brewington | G06F 16/24575 |
| 10,462,238 B1* | 10/2019 | Naganathan | H04L 51/34 |
| 10,674,476 B1 | 6/2020 | Baker et al. | |
| 2002/0102993 A1* | 8/2002 | Hendrey | G06Q 30/02 455/456.3 |
| 2003/0065768 A1* | 4/2003 | Malik | H04L 61/1576 709/224 |
| 2004/0199663 A1* | 10/2004 | Horvitz | H04W 4/02 709/238 |
| 2008/0112567 A1* | 5/2008 | Siegel | H04R 1/10 381/58 |
| 2008/0227467 A1* | 9/2008 | Barnes | H04W 4/23 455/456.2 |
| 2008/0260169 A1* | 10/2008 | Reuss | H04R 27/00 381/58 |
| 2008/0304638 A1 | 12/2008 | Jackoqitz et al. | |
| 2010/0130233 A1* | 5/2010 | Parker | H04M 1/72538 455/456.3 |
| 2010/0169264 A1* | 7/2010 | O'Sullivan | G06Q 10/10 706/52 |
| 2011/0045801 A1* | 2/2011 | Parker, II | H04W 4/029 455/411 |
| 2011/0071868 A1* | 3/2011 | Parker | G16H 80/00 705/2 |
| 2011/0231225 A1 | 9/2011 | Winters | |
| 2011/0231305 A1 | 9/2011 | Winters | |
| 2011/0295731 A1 | 12/2011 | Waldron | |
| 2012/0102153 A1 | 4/2012 | Kemp et al. | |
| 2012/0149342 A1* | 6/2012 | Cohen | H04L 51/26 455/412.2 |
| 2013/0212185 A1 | 8/2013 | Pasquero et al. | |
| 2013/0225210 A1* | 8/2013 | Rosener | H04W 4/12 455/458 |
| 2014/0052475 A1 | 2/2014 | Madan | |
| 2014/0095627 A1* | 4/2014 | Romagnino | H04L 51/043 709/206 |
| 2015/0200899 A1* | 7/2015 | Sanketi | H04L 51/24 709/206 |
| 2015/0324703 A1* | 11/2015 | Kim | G06Q 50/01 706/52 |
| 2016/0027102 A1 | 1/2016 | Smith et al. | |
| 2016/0072748 A1* | 3/2016 | Saar | H04W 4/029 455/414.1 |
| 2016/0302030 A1* | 10/2016 | White | H04W 4/02 |
| 2016/0337300 A1* | 11/2016 | Ossia | H04L 51/043 |
| 2016/0379127 A1* | 12/2016 | Childress | G06Q 10/107 706/11 |
| 2017/0316320 A1* | 11/2017 | Jamjoom | H04L 51/24 |
| 2018/0103005 A1* | 4/2018 | Yadav | H04L 51/24 |
| 2018/0108103 A1* | 4/2018 | Li | G06Q 20/322 |

OTHER PUBLICATIONS

"U.S. Appl. No. 15/456,061, Final Office Action dated Feb. 9, 2018", 18 pgs.
"U.S. Appl. No. 15/456,061, Final Office Action dated Mar. 27, 2019", 12 pgs.
"U.S. Appl. No. 15/456,061, Non Final Office Action dated Aug. 11, 2017", 23 pgs.
"U.S. Appl. No. 15/456,061, Non Final Office Action dated Sep. 17, 2018", 13 pgs.
"U.S. Appl. No. 15/456,061, Notice of Allowance dated Jan. 23, 2020", 7 pgs.
"U.S. Appl. No. 15/456,061, Response filed Feb. 18, 2019 to Non Final Office Action dated Sep. 17, 2018", 10 pgs.
"U.S. Appl. No. 15/456,061, Response filed Jun. 11, 2018 to Final Office Action dated Feb. 9, 2018", 9 pgs.
"U.S. Appl. No. 15/456,061, Response filed Nov. 9, 2017 to Non Final Office Action dated Aug. 11, 2017", 10 pgs.
U.S. Appl. No. 15/456,061 U.S. Pat. No. 10,674,476, filed Mar. 10, 2017, Contextual Aware Electronic Alert System.

\* cited by examiner

CONTEXTUAL AWARE ELECTRONIC ALERT SYSTEM

CROSS-REFERENCE TO RELATED APPLICATION

This application is a continuation of U.S. patent application Ser. No. 15/456,061, filed Mar. 10, 2017, now issued as U.S. Pat. No. 10,674,476, which is incorporated by reference herein in its entirety.

TECHNICAL FIELD

Embodiments described herein generally relate to electronic messaging and in particular, but without limitation, to contextual aware electronic alert systems.

BACKGROUND

Users receive numerous electronic messages (e.g., e-mails, push notifications, web page advertisements) each day. The volume of messages may be such that important messages are ignored and/or not seen at all. Furthermore, in some instances, once a message is presented and ignored by the user, there is not an opportunity for the user to see the message again.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Users are often inundated with a number of alerts, notifications, emails, etc. In some instances, a user may dismiss the notification only to realize later that they wanted to follow up on something contained within the notification. For example, consider a user browsing a webpage in which content from multiple sources is displayed on a single page (e.g., a news story and an advertisement). The user may not wish to act on information in the advertisement at the current time, but may want to purchase or review something they see as sometime in the future. In other instances, it may not be an advertisement at all that is presented to the user. For example, an alert message may be displayed on a webpage that is specific to the user, such as a reminder to rebalance their 401(k) or update their estate plan after the birth of a child.

The present disclosure describes a number of features to alleviate the technical problem of fleeting electronic alerts, such as the advertisements or reminders described above. The systems and methods permit a user to choose an action on alert at the time is received, as well as review the alert at later time. One of the technical objectives realized by the systems and methods is using device context to infer a user's situation as a mechanism for when and how to deliver an electronic alert. Other technical objectives may be realized using the systems and methods below, as one or ordinary skill in the art will recognize.

Figure 1:
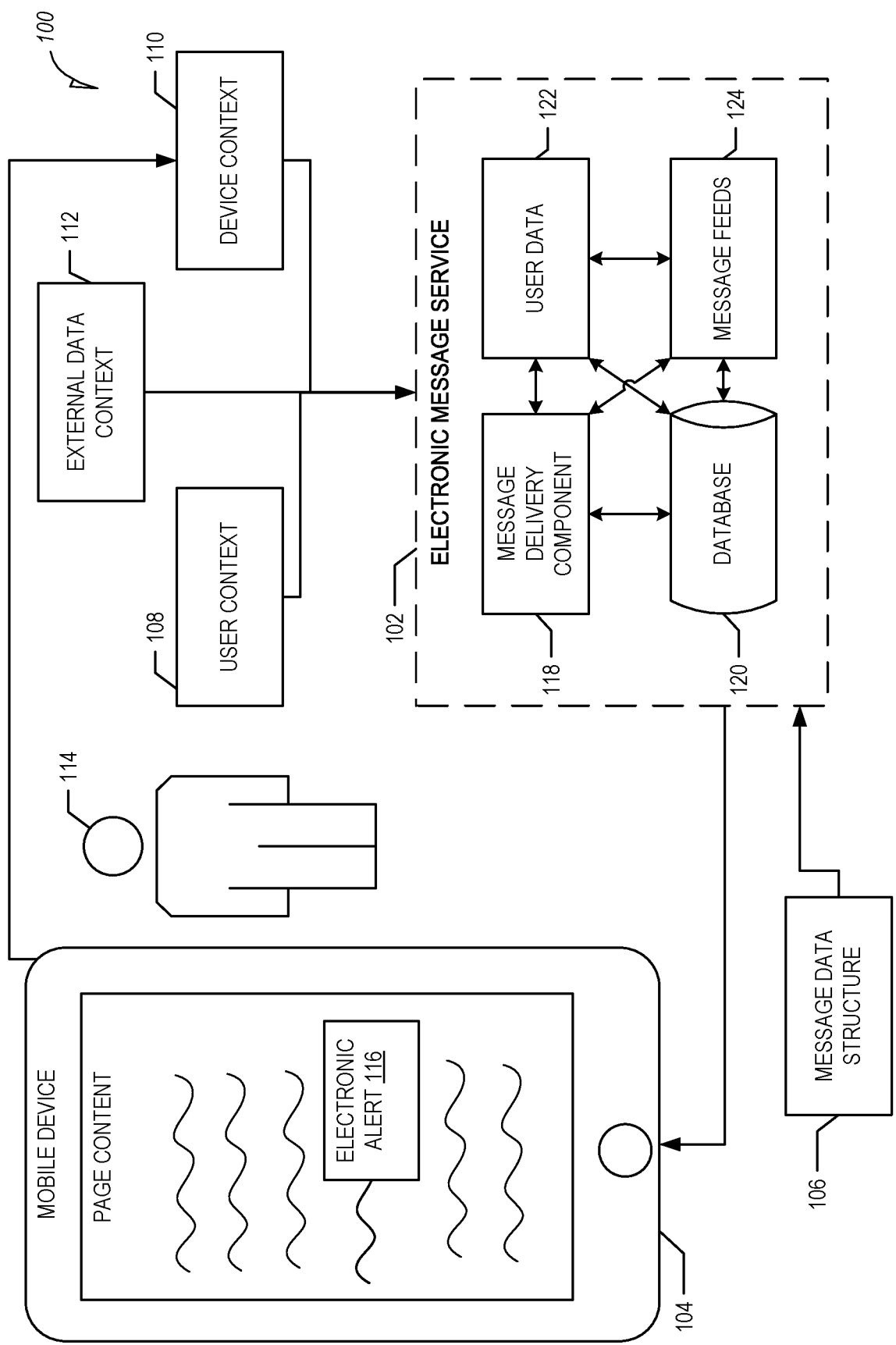
FIG. 1 is a schematic diagram of components for transmitting a context dependent electronic message to device, according to various examples.

FIG. 1 is a schematic diagram 100 of components for transmitting the context dependent electronic message to device, according to various examples. The diagram 100 includes electronic message service 102, mobile device 104, message data structure 106, user context 108, device context 110, and external data context 112. The mobile device 104 is illustrated as including electronic alert 116. Electronic message service 102 is illustrated as including message delivery component 118, database 120, user data 122, and message feeds 124. The components of electronic message service 102 may be part of a single computing device (e.g., a server) or located in multiple computing devices that may be co-located or geographical dispersed.

In various examples, computing device(s), not illustrated, determine that electronic alert 116 is relevant to user 114 before message data structure 106 is processed by electronic message service 102. For example, another electronic service may determine that a life event has occurred (e.g., a birth) in the user's 114 family and that a courtesy reminder to update user's 114 estate plan may be useful. Electronic message service 102 may receive the message data structure 106 and determine a time and mechanism for delivering the electronic alert to user 114. In some examples, electronic message service 102 may make the determination that an alert should be presented to user 114.

In various examples, the components of diagram 100 may communicate via one or more networks (not shown). The networks may include local-area networks (LAN), wide-area networks (WAN), wireless networks (e.g., 802.11 or cellular network), the Public Switched Telephone Network (PSTN) network, ad hoc networks, cellular, personal area networks or peer-to-peer (e.g., Bluetooth®, Wi-Fi Direct), or other combinations or permutations of network protocols and network types. The networks may include a single local area network (LAN) or wide-area network (WAN), or combinations of LAN's or WAN's, such as the Internet.

Additionally, components in the diagram 100 may communicate using one or more application programming interfaces (APIs). An API call may include a parameter for a unique user identification. The user identification may be in the form of a username and password, a session identifier, or a token. The API call may further include one or more of user context 108, external data context 112, or device context 110. The user identification may also be used when requesting a message feed of user 114, as will be described further herein.

One or more web servers (not shown) may transmit information to a component. For example, electronic alert 116 may be part of a webpage served by a web server. Electronic alert 116 may be placed into a container generally used for advertisement. The web server may also serve content beyond electronic alert 116, such as page content. Electronic message service 102 may transmit electronic alert 116 to the web server before it is presented on mobile device 104.

In various examples, user context 108 includes information specific to a user such as, but not limited to, physiological readings of the user, calendar appointments, audible levels of the environment of the user, and a current location of user 114. The user context 108 may derived from one or more type of device (e.g., wearable, mobile, etc.) and location (e.g., disparate computing systems). In various examples, user context 108 data may be periodically transmitted to electronic message service 102 using an application programming interface (API) over a network.

Data storage of mobile device 104 or network-based services may store calendar data for user 114. The calendar data may indicate current and upcoming appointments for user 114. This information be used in determining when to present electronic alert 116 to user 114. Additionally user 114 may be using one or more wearable devices (e.g., heart rate monitors, smart watches, etc.) that may be in communication with mobile device 104. The readings from the wearable devices may be transmitted to electronic message service 102 as part of user context 108. Similarly, sensor readings (e.g., microphone, accelerometer, image sensors, GPS sensor) of mobile device 104 may be transmitted to electronic message service 102 as part of user context 108. User 114 may give permission to an application associated with electronic message service 102 to access the sensor readings.

External data context 112 may include data that is relevant to more than one user; however, it may be tailored to user 114. For example, external data context 112 may include environmental information such as current weather conditions, traffic conditions, etc., that are associated with the current location or future location of user 114. External data context 112 may be requested by electronic message service 102 using an API call to an external service. API call may include geographic coordinates of user 114 based on GPS readings of mobile device 104 that have been received as part of user context 108.

In various examples, device context 110 may include information associated with the capabilities of mobile device 104. Capabilities may include screen size, screen resolution, available sensors, model number, version information, etc. The device context 110 may be transmitted using an API separately or in combination with user context 108 and external data context 112. For a given user, there may be multiple device contexts. Accordingly, electronic message service 102 may retrieve the latest device context 110 for the user 114 in making a determination of when/how to display electronic alert 116. Details of this determination will be discussed further herein. Furthermore, although FIG. 1 illustrates a mobile device, user 114 may have multiple different types of computing devices (e.g., personal laptops, vehicle interfaces, wearable devices, etc.) with their own device contexts.

In an example, a user subscribes to electronic message service 102 for receiving electronic alerts. The electronic alerts may be static information or active information. Static information may be information that may be considered newsworthy to the user, but otherwise does not require an action by the user. Active information may be information that includes one or more actions a user may take in relationship to the information included in the alert. The information component and actions associated with an alert may be defined in message data structure 106—an example which is discussed in relationship to FIG. 2, element 202.

User data 122 may include credential, personal, and preference information of user 114. Credential information may include authentication information for a number of websites (e.g., financial websites, social media websites, calendar websites, etc.). The credential information may be used to access these websites to retrieve personal information about the user. Personal information may include biographical details, employment status, marital status, etc. The preference information may identify preferences of user 114 with respect to electronic message service 102. The preferences may identify times of the day to send/not send electronic messages, a list of approved computing devices to send alerts, preferred frequency of alerts, default actions for alerts, etc.

An application may be provided by electronic message service 102 to view and edit the user data 122. The application may be stored on one or more computing devices (e.g., mobile device 104). The application may also be provided as a web application served from a web server.

The application may display user interfaces to user 114 for interacting with user data 122. Initially, user 114 may authentication him/herself to electronic message service 102 using previously determined login credentials. Then, electronic message service 102 may retrieve previously stored user data 122 from database 120, format it (e.g., a drop-down menu, list, etc.) and display it to user 114. User 114 may make changes to the information such as updating or adding credential information, biographical information, or preferences. The changed data may be stored back in database 120 as associated with user 114. An association may be a unique user identifier or token that has been assigned to the user.

Message feeds 124 may store received electronic alerts for a user. For example, a user-specific message feed may be associated with user 114 (e.g., using the unique user identification). A standardized format may be utilized in message feeds 124 for the alerts, such as extensible markup language (XML). The user-specific message feed of message feeds 124 may be made accessible via a web server using Really Simple Syndication (RSS) web standards. The XML/RSS feed may be stored within database 120.

An application (e.g., a web browser or dedicated application) on mobile device 104 may access the RSS message feed associated with the user to see past electronic alerts for the user. In an example, user 114 may dismiss electronic alerts (e.g., activating a user interface button) in a message feed. The dismissed messages may be archived for later retrieval by user 114 if desired. As with electronic alert 116, alerts in message feeds 124 may have actions that may be taken by user 114.

Figure 2:
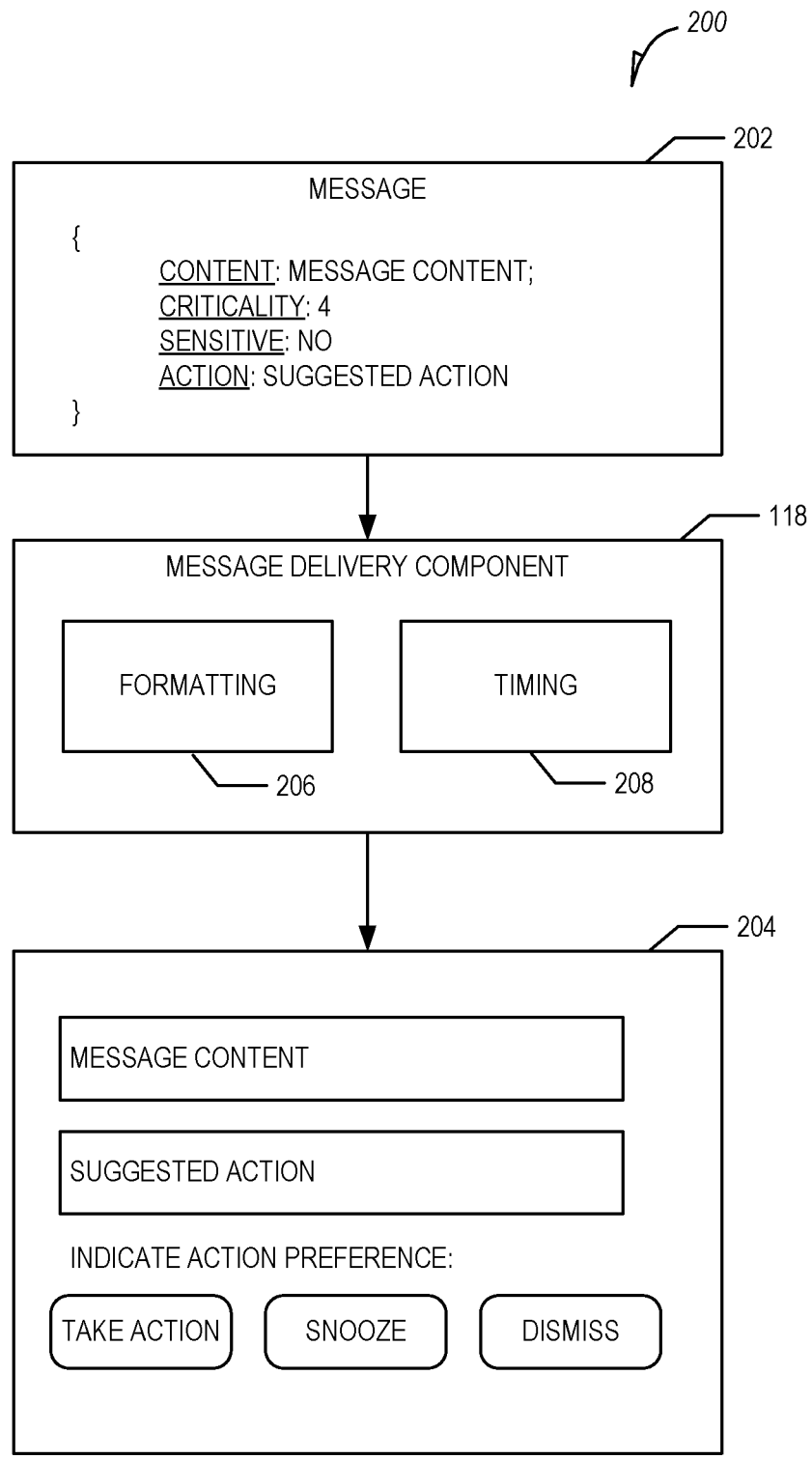
FIG. 2 illustrates an example of processing a received message by a message delivery component, according to various examples.

Message delivery component 118 may process received message data (e.g., message data structure 106) to determine when, where, and in and what format to deliver an electronic alert. FIG. 2 illustrates an example 200 of processing a received message by message delivery component 118. Example 200 includes message 202, formatting component 206, timing component 208, and formatted message 204.

Message 202 is an example of a data structure that may be received at electronic message service 102. Message 202 includes an example defined format with four fields: content, criticality, sensitivity, and actions. More of fewer fields may be used as one of ordinary skill in the art would recognize. In an example, message 202 is received as part of an API call to electronic message service 102. The API call may also include a user identification that indicates the intended recipient for message 202. Message delivery component 118 may parse message 202 to retrieve the message content, criticality, sensitivity, and actions (if any).

Message delivery component 118 may use a combination of the parsed information, received context information (e.g., user context 108, device context 110, and external data context 112) and user data 122 to determine when to send the message and in what format—using timing component 208 and formatting component 206, respectively. Formatting component 206 and timing component 208 may be implemented as program code executing on at least one processor of a computing device associated with electronic message service 102.

Timing component 208 may use several variables in determining when to send formatted message 204 to a device associated with user 114. These variables may include current data such as:
- a likelihood the user is in transit (e.g., using the speed of a device based on GPS readings);
- a likelihood the user is alone (e.g., audio levels of the device exceed a certain decibel reading);
- appointment information (e.g., based on received calendar information);
- physiological readings (e.g., from a wearable device); and
- the current time Variables readings may be collected over time and correlated with interactions taken with respect to electronic alerts by a specific user and/or a population of users. For example, electronic message service 102 may store variable readings (e.g., speed, decibel readings, appointments, physiological readings, etc.) at the time an alert is sent to a user. Electronic message service 102 may additionally store information indicating whether the user took an action (e.g., selected one of the suggested actions) or dismissed the alert. Based on this information, statistical techniques (e.g., regression analysis) may be used to determine, for a given time of day, what variables values are most determinative of whether a user is likely to take an action with an alert. In various examples, electronic message service 102 may perform the above type of analysis for each user of the service. Before a training period may be completed for a specific user, data from a population of users may be used to determine when to send a message.

For example, after collecting data for a training period (e.g., a week) from a population of users (or a specific user) the analysis may reveal that between the hours of 9-5, M-F, the most determinative data point is appointment information (e.g., 50% of the likelihood), then audible level (e.g., 20% of the likelihood), then the speed of the device (e.g., 15% of the likelihood). The analysis may further reveal that, during those same hours, physiological readings were responsive for just 5% of the likelihood of taking an action. In some instances, the time of the day may itself be the most determinative factor. Further analysis may indicate that the time of the day is of less importance than other variables. For example, the analysis may indicate that the audible level of a user device is the most predictive variable for whether the user will take an action.

The results of the analysis may be used in a weighted formula (e.g., 0.5[appointment value]+0.2[audible level]+ 0.15[speed]) to calculate the likelihood of response for a given set of variables. The current data may be translated and/or standardized in order to be used with the formula. For examples, having an appointment may be '1' whereas no appointment is '0.' Similarly, 60-70 dB reading may be '1', 50-59 dB reading may be '0.75' and 30 dB reading be a '0.' The translation and standardization formulas may be stored in database 120.

A threshold likelihood (e.g., 50%) of responding to a message may be needed before a message is sent to a user. For example, current data of the user may be retrieved when a message is received as discussed previously. Then, based on the data values and the previously conducted analysis, electronic message service 102 may determine there is a 30% chance the user may take an action. Timing component 208 may then postpone delivery of the message for an hour and see if the likelihood meets the threshold. Different thresholds may be used based on the criticality of message—e.g., a '5' criticality may have a 25% threshold and a '1' criticality a 60% threshold. The threshold may also lower based on the amount of time passed since the message was received (e.g., a 20% threshold after 12 hours).

In some examples, information contained within message 202 may override a timing decision based on the likelihood of response. A message that indicates it is sensitive may not be delivered if the audible level is above a certain threshold reading—indicating the user is likely not alone—in certain examples. Timing component 208 may delay transmitting formatted message 204 until such time as the audible level drops below the threshold.

Formatting component 206 may process message 202 into formatted message 204 for display on a computing device of a user. The format may be based on, among other factors, the capabilities of the device (e.g., using device content 110) the message is to appear. For example, electronic message service 102 may be determine the computing device most likely being used by user 114 at the time of delivery. To make this determination, electronic message service 102 may examine the time device context 110 information is received. Accordingly, the device that most recently transmitted device context 110 may be considered the device most likely being used by user 114.

Upon determining which device to transmit the message to, formatting component 206 may use the device context 110 for that device to generate formatted message 204 using a template. Templates may include a message size (e.g., 200px by 200px size) and locations for content and actions of message 202. There may be different templates for each device. Formatting component 206 may also place user interface elements to take an action, snooze the message (e.g., transmit the message again 1 hour later), or dismiss the message (e.g., do not display again).

In some examples, formatting component 206 may format the message as a push notification to the device. In some examples, formatting component 206 may format the message for placement into a webpage. Accordingly, the template may be based on a size of the container the webpage in which the message may appear. In an example, formatting component 206 may generate more than one message to transmit to different devices.

Figure 3:
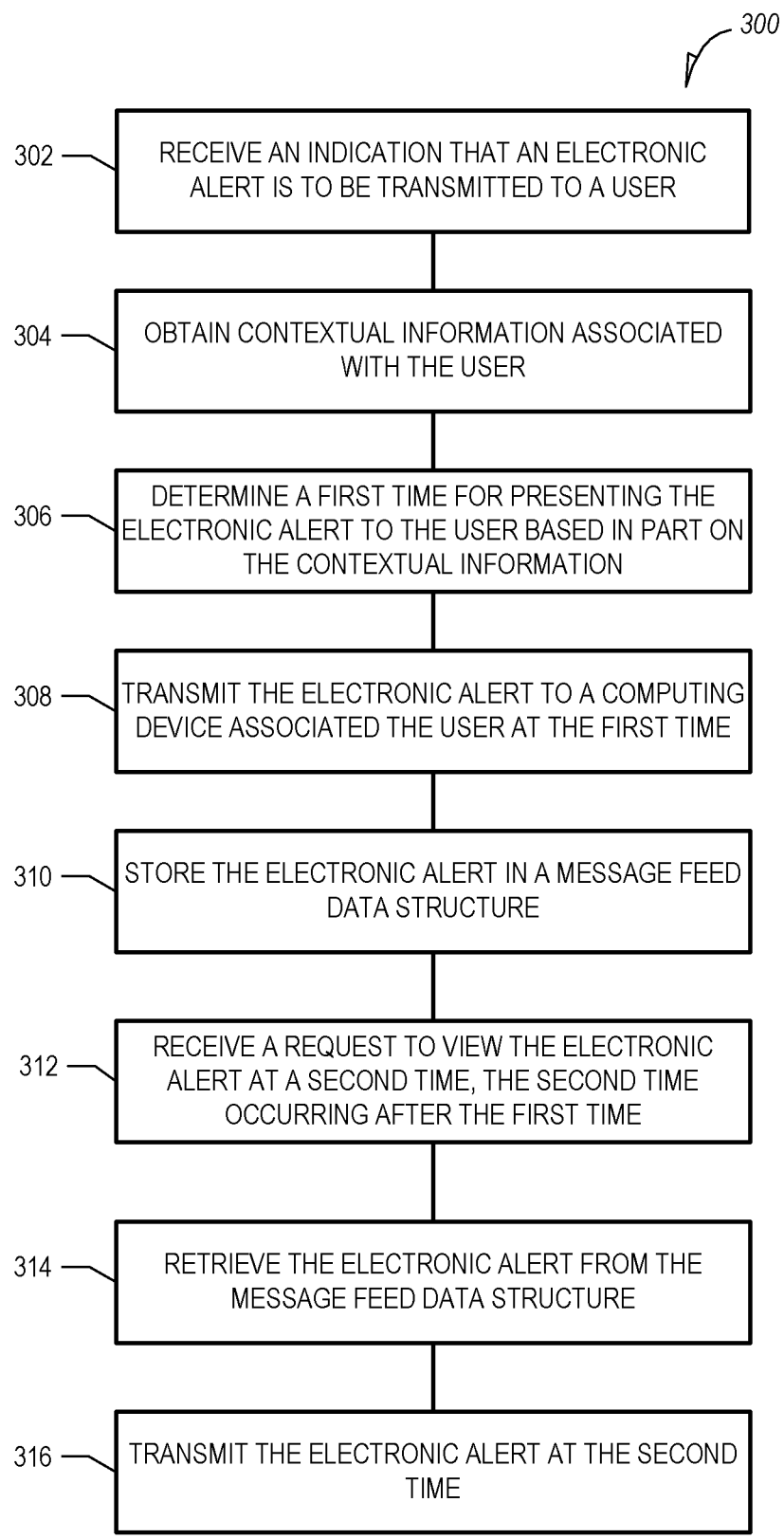
FIG. 3 illustrates a flowchart of a method that may implemented using one of more computing systems, according to various examples.

FIG. 3 illustrates a flowchart of a method 300 that may implemented using one of more computing systems, according to various embodiments. For example, program code stored on a storage device may be executed by one or more processors to cause the one or more processors to perform the operations described in method 300. Performance may include controlling one or more of display devices, network interfaces, storage devices, etc.

In an example, method 300 includes receiving an indication that an electronic alert is to be transmitted to a user (302). The indication may be received at a computing system such as electronic message service 102 and may include an identification of the user. The indication may be formatted according to a message data structure (e.g., message data structure 106 or message 202) and may include a content component and an action component. The action component may include a URL. The URL may include parameters that allow a user to automatically login to a website and automatically take an action (e.g., transfer dollars from account A to B, generate an e-mail, applying for a mortgage etc.).

Method 300 further includes obtaining contextual information associated with the user (304). Contextual information may include an indication of whether or not a computing device (e.g., a mobile device of a user) is in motion. The contextual information may include physiological characteristics of the user received from a wearable device of the user. The contextual information may also include a location of a computing device of the user. The contextual information may include an indication (a dB reading of a device) of whether or not the user is likely alone. In an example, the indication includes one or more sensor readings of one more computing devices. The indications may be received over an API at the computing system.

Method 300 also includes determining a first time for presenting the electronic alert to the user based in part on the contextual information (306). The first time may be based on a weighed formula using the received contextual information as described with respect to timing component 208. The first time may be later than the time the indication is received at operation 302 if the likelihood the user will respond to the electronic alert is lower than a threshold percentage.

At operation 308, the electronic alert may be transmitted to a computing device associated with the user at the first time. Transmitting may include formatting the electronic for display on the computing device using a template. Transmitting may include sending the formatted message to a web server that hosts a website. In such an instance, the formatted message may appear as part of a webpage to the user on their computing device. Transmitting may include sending the electronic alert as a push notification.

Method 300 further includes storing the electronic alert in a message feed data structure (310). The electronic alert may be stored as associated with a received user identification. A request may be received at a second time to view the electronic (312). The request may be received after a user provides login credentials to a website associated with electronic message service 102. In response to the request, the electronic alert may be received from the message feed data structure (314) and transmitted at the second time (316). In an example, more than one electronic alert is presented to the user in response to the request at operation 314. For example, all unattended to (e.g., non-dismissed) messages may be presented.

Example Computer System

Embodiments described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or several components, modules, or mechanisms. Modules may be hardware, software, or firmware communicatively coupled to one or more processors to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 4:
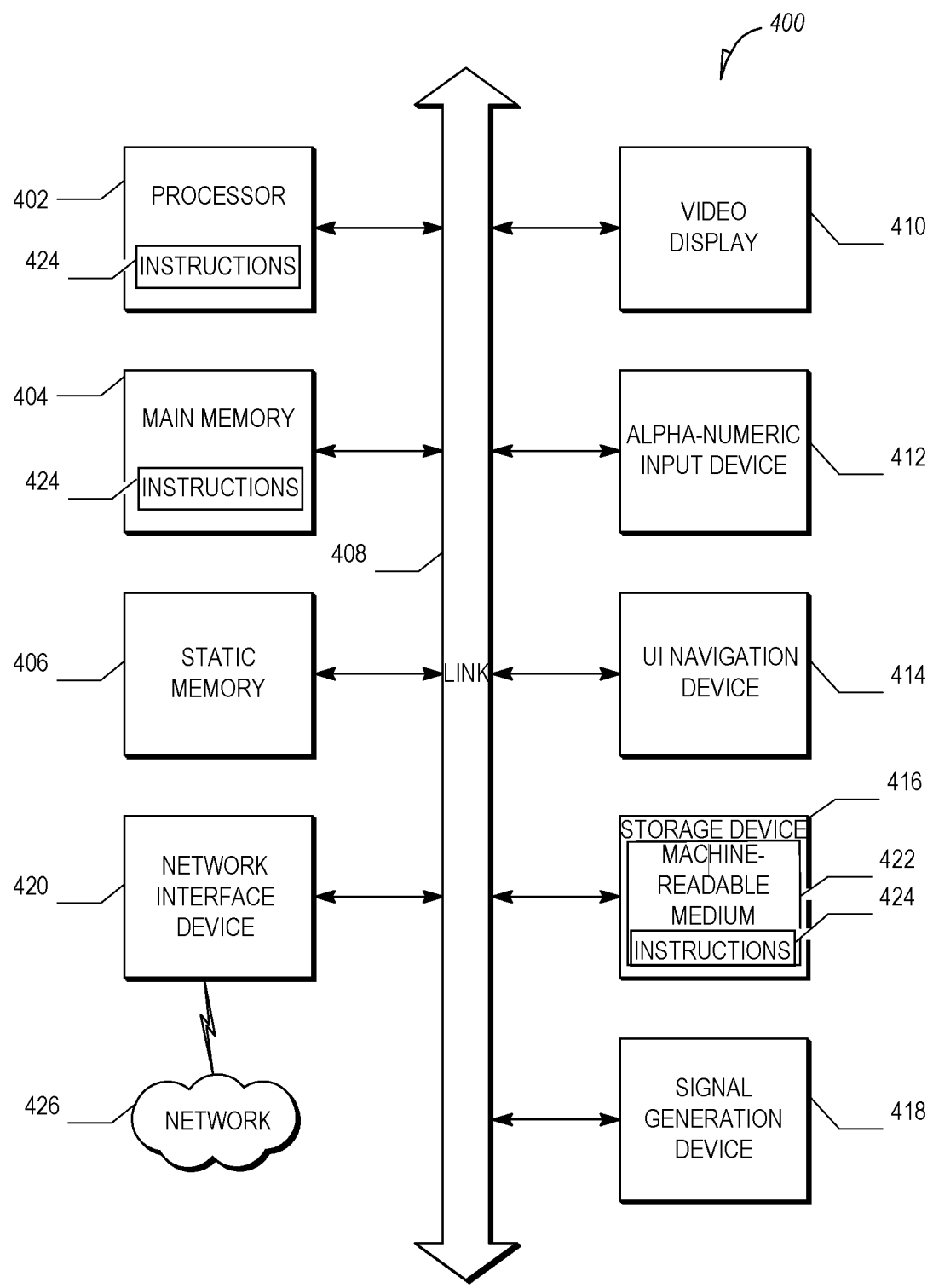
FIG. 4 is a block diagram illustrating an example machine upon which any one or more of the techniques (e.g., methodologies) discussed herein may be performed, according to an example embodiment.

FIG. 4 is a block diagram illustrating a machine in the example form of a computer system 400, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 400 includes at least one processor 402 (e.g., a central processing unit (CPU), a graphics processing unit (GPU) or both, processor cores, compute nodes, etc.), a main memory 404 and a static memory 406, which communicate with each other via a link 408 (e.g., bus). The computer system 400 may further include a video display unit 410, an alphanumeric input device 412 (e.g., a keyboard), and a user interface (UI) navigation device 414 (e.g., a mouse). In one embodiment, the video display unit 410, input device 412 and UI navigation device 414 are incorporated into a touch screen display. The computer system 400 may additionally include a storage device 416 (e.g., a drive unit), a signal generation device 418 (e.g., a speaker), a network interface device 420, and one or more sensors (not shown), such as a global positioning system (GPS) sensor, compass, accelerometer, or other sensor.

The storage device 416 includes a machine-readable medium 422 on which is stored one or more sets of data structures and instructions 424 (e.g., software) embodying or utilized by any one or more of the methodologies or functions described herein. The instructions 424 may also reside, completely or at least partially, within the main memory 404, static memory 406, and/or within the processor 402 during execution thereof by the computer system 400, with the main memory 404, static memory 406, and the processor 402 also constituting machine-readable media.

While the machine-readable medium 422 is illustrated in an example embodiment to be a single medium, the term "machine-readable medium" may include a single medium or multiple media (e.g., a centralized or distributed database, and/or associated caches and servers) that store the one or more instructions 424. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A method comprising:
   receiving an indication that an electronic alert is to be transmitted to a user;
   obtaining current contextual information associated with the user at a current time;
   determining a percentage likelihood that the user will respond to the electronic alert at the current time based on the current contextual information;
   determining a first time for presenting the electronic alert to the user based in part on the percentage likelihood being lower than a percentage threshold, wherein a value for the percentage threshold is based on a criticality of the electronic alert and the value decreases over time and the first time is later than the current time and based on a user preference;
   transmitting the electronic alert to a computing device associated with the user at the first time;
   storing the electronic alert in a message feed data structure;
   receiving a request to view the electronic alert at a second time, the second time occurring after the first time;
   in response to the request, retrieving the electronic alert from the message feed data structure; and
   transmitting the electronic alert at the second time.

2. The method of claim 1, wherein the contextual information includes an indication of whether the computing device is in motion.

3. The method of claim 1, wherein obtaining contextual information of the user further comprises retrieving physiological characteristics of the user.

4. The method of claim 3, wherein retrieving physiological characteristics of the user includes retrieving the physiological characteristics from a wearable computing device of the user.

5. The method of claim 1, wherein obtaining contextual information of the user comprises retrieving a location of the computing device associated with the user.

6. The method of claim 1, wherein the contextual information of the user includes a likelihood that the user is alone.

7. The method of claim 1, wherein the indication is received as a message data structure that includes a content component and an action component.

8. A non-transitory computer-readable medium comprising instructions, which when executed by at least one processor, configure the at least one processor to perform operations comprising:
   receiving an indication that an electronic alert is to be transmitted to a user;
   obtaining current contextual information associated with the user at a current time;
   determining a percentage likelihood that the user will respond to the electronic alert at the current time based on the current contextual information;
   determining a first time for presenting the electronic alert to the user based in part on the percentage likelihood being lower than a percentage threshold, wherein a value for the percentage threshold is based on a criticality of the electronic alert and the value decreases over time and the first time is later than the current time and based on a user preference;
   transmitting the electronic alert to a computing device associated with the user at the first time;

storing the electronic alert in a message feed data structure;

receiving a request to view the electronic alert at a second time, the second time occurring after the first time;

in response to the request, retrieving the electronic alert from the message feed data structure; and transmitting the electronic alert at the second time.

9. The non-transitory computer-readable medium of claim 8, wherein the contextual information includes an indication of whether the computing device is in motion.

10. The non-transitory computer-readable medium of claim 8, wherein the operation of obtaining contextual information of the user further comprises retrieving physiological characteristics of the user.

11. The non-transitory computer-readable medium of claim 10, wherein the operation of retrieving physiological characteristics of the user includes retrieving the physiological characteristics from a wearable computing device of the user.

12. The non-transitory computer-readable medium of claim 8, wherein the operation of obtaining contextual information of the user comprises retrieving a location of the computing device.

13. The non-transitory computer-readable medium of claim 8, wherein the contextual information of the user includes a likelihood that the user is alone.

14. The non-transitory computer-readable medium of claim 8, wherein the indication is received as a message data structure that includes a content component and an action component.

15. A system comprising:

at least one processor;

a storage device comprising instructions, which when executed by the at least one processor, configure the at least one processor to:

receive an indication that an electronic alert is to be transmitted to a user;

obtain current contextual information associated with the user at a current time;

determine a percentage likelihood that the user will respond to the electronic alert at the current time based on the current contextual information;

determine a first time for presenting the electronic alert to the user based in part on the percentage likelihood being lower than a percentage threshold, wherein a value for the percentage threshold is based on a criticality of the electronic alert and the value decreases over time and the first time is later than the current time and based on a user preference;

transmit the electronic alert to a computing device associated with the user at the first time;

store the electronic alert in a message feed data structure;

receive a request to view the electronic alert at a second time, the second time occurring after the first time;

in response to the request, retrieve the electronic alert from the message feed data structure; and transmit the electronic alert at the second time.

16. The system of claim 15, wherein the contextual information includes an indication of whether the computing device is in motion.

17. The system of claim 15, wherein to obtain contextual information of the user, the at least one processor is further configured to retrieve physiological characteristics of the user.

18. The system of claim 17, wherein to retrieve physiological characteristics of the user, the at least one processor is configured to retrieve the physiological characteristics from a wearable computing device of the user.

19. The system of claim 15, wherein to obtain contextual information of the user the at least one processor is configure to retrieve a location of the computing device associated with the user.

20. The system of claim 15, wherein the contextual information of the user includes a likelihood that the user is alone.

21. The system of claim 15, wherein the indication is received as a message data structure that includes a content component and an action component.

* * * * *